(12) United States Patent
Jintaseranee et al.

(10) Patent No.: US 9,179,438 B1
(45) Date of Patent: Nov. 3, 2015

(54) DETERMINATION OF WIRELESS DEVICE MOVEMENT TO AND FROM AN AREA OF INTEREST USING A ROUTE UPDATE RADIUS

(71) Applicant: Sprint Communications Company L.P., Overland Park, KS (US)

(72) Inventors: Kosol Jintaseranee, Millbrae, CA (US); Mark Evans, El Granada, CA (US); Heesook Choi, Castro Valley, CA (US)

(73) Assignee: Sprint Communications Company L.P., Overland park, KS (US)

( * ) Notice: Subject to any disclaimer, the term of this patent is extended or adjusted under 35 U.S.C. 154(b) by 219 days.

(21) Appl. No.: 13/896,088

(22) Filed: May 16, 2013

(51) Int. Cl.
 *H04W 68/02* (2009.01)
(52) U.S. Cl.
 CPC ..................... *H04W 68/02* (2013.01)
(58) Field of Classification Search
 CPC .................................................. H04W 68/02
 See application file for complete search history.

(56) References Cited

U.S. PATENT DOCUMENTS

| 7,979,081 | B1 | 7/2011 | Sharobim |
| 8,195,157 | B2 | 6/2012 | Rossetti et al. |
| 8,213,959 | B2 | 7/2012 | Ramachandran et al. |
| 2007/0249329 | A1 | 10/2007 | Zou |
| 2008/0207227 | A1 | 8/2008 | Ren et al. |
| 2009/0182501 | A1* | 7/2009 | Fyke et al. ............. 701/208 |
| 2011/0244910 | A1 | 10/2011 | Sharobim |
| 2012/0052874 | A1* | 3/2012 | Kumar ................. 455/456.1 |

* cited by examiner

*Primary Examiner* — Chuong A Ngo (57) ABSTRACT

Embodiments disclosed herein provide systems and methods for determining device movement to and from an area of interest using a route update radius. In a particular embodiment, a method provides identifying an area of interest within a geographic area and determining a first access node of a wireless communication network having a first wireless signal coverage area that includes at least part of the area of interest. The method further provides setting a route update radius to a distance that reflects the size of the at least part of the area of interest and transferring the route update radius to the wireless communication device.

20 Claims, 6 Drawing Sheets

DETERMINATION OF WIRELESS DEVICE MOVEMENT TO AND FROM AN AREA OF INTEREST USING A ROUTE UPDATE RADIUS

TECHNICAL BACKGROUND

To establish a communication session with a wireless communication device, a wireless communication network typically broadcasts a page for the wireless device on a paging channel of at least one wireless access node. The likelihood that the wireless device will receive the page is increased when multiple wireless access nodes broadcast the page. Thus, broadcasting the page from many access nodes provides the best chance that the wireless device will receive the page. Unfortunately, the technique of broadcasting the page from many access nodes often wastes network resources that are not even close to the wireless device.

Accordingly, modern wireless networks first attempt to page a wireless device on access nodes around an area that the wireless device was last located. To assist in the determination of which access nodes should broadcast the signal, the wireless device is configured to update its location with a wireless network so that the wireless network can identify access nodes around that location that would most likely succeed in paging the wireless device. The wireless network provides the wireless device with a distance from the device's current access node that the device may travel before needing to update the location again. The distance is commonly referred to as a route update radius and typically corresponds to a distance whereby the wireless device would move beyond the coverage area of access nodes currently designated to page the wireless device. Upon exceeding the radius, the wireless device updates its location to the wireless network and the wireless network determines a new set of access nodes that would most likely succeed in paging the wireless device.

OVERVIEW

Embodiments disclosed herein provide systems and methods for determining device movement to and from an area of interest using a route update radius. In a particular embodiment, a method provides identifying an area of interest within a geographic area and determining a first access node of a wireless communication network having a first wireless signal coverage area that includes at least part of the area of interest. The method further provides setting a route update radius to a distance that reflects the size of the at least part of the area of interest and transferring the route update radius to the wireless communication device.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
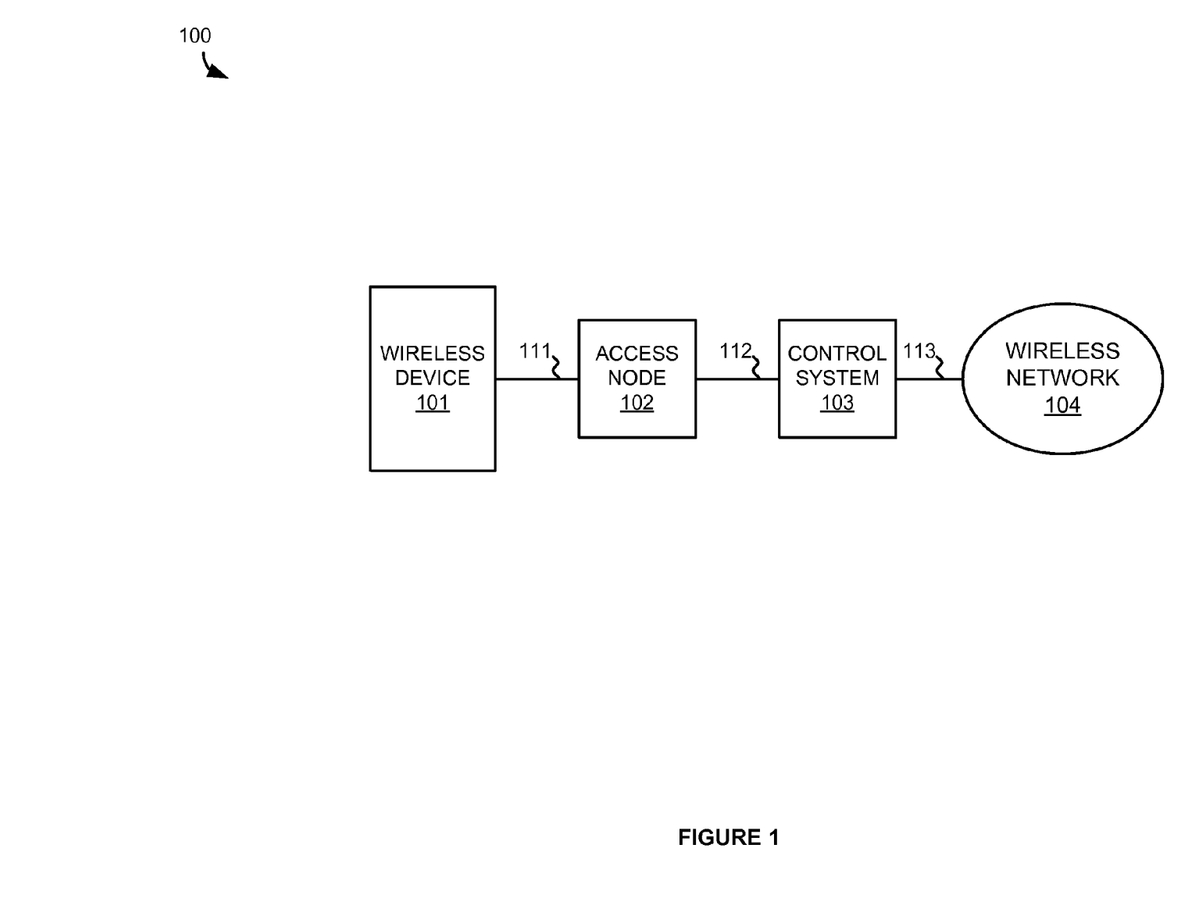
FIG. 1 illustrates a wireless communication system for determining device movement to and from an area of interest using a route update radius.

FIG. 1 illustrates wireless communication system 100. Wireless communication system 100 includes wireless communication device 101, wireless access node 102, communication control system 103, and wireless communication network 104. Wireless communication device 101 and wireless access node 102 communicate over wireless link 111. Wireless access node 102 and communication control system 103 communicate over communication link 112. Communication control system 103 and wireless communication network 104 communicate over communication link 113.

In operation, wireless network 104 provides wireless communication services to wireless device 101 through access node 102. Wireless network 104 may also provide the communication services to additional wireless devices through access node 102 or other access nodes. If wireless network 104 needs to contact wireless device 101 for provision of communication services, such as to establish an incoming call with wireless device 101, wireless network 104 instructs access node 102 to send a page on a wireless paging channel to wireless device 101. Upon receiving the page, a traffic channel is established between wireless device 101 and access node 102 in order to exchange communications with wireless network 104.

Since wireless device 101 may be mobile, wireless network 104 may not know that wireless device 101 is located within the wireless signal coverage area of access node 102 when wireless device 101 is dormant. Thus, wireless network 104 instructs other access nodes to also send the page. The access nodes that send the page are determined based on a previous location of wireless device 101. For example, if wireless device 101 was last located in the coverage area of access node 102, then wireless network 104 may instruct access node 102 and any other access node at least within a reasonable distance (i.e. a number of miles) that wireless device 101 could have traveled since the last location was determined. Using this method, wireless network 104 has a greater chance of successfully paging wireless device 101 while not using the paging resources of access nodes that are unlikely to succeed in paging wireless device 101 since they are too far away from the last location of wireless device 101.

During times when wireless device 101 is dormant, wireless network 104 will not know where wireless device 101 is located. Thus, if wireless device 101 is dormant for a long period of time, then wireless network 104 may not know a location of wireless device 101 that will allow wireless network 104 to select access nodes for paging wireless device 101. To overcome this issue, wireless device 101 is provided with a route update radius from an access node. The route update radius defines a distance from the access node that wireless device 101 can travel before wireless device 101 updates its location with wireless network 104. Accordingly, if wireless device 101 is dormant and moves beyond the route update radius, wireless device 101 will awaken from dormancy to transfer its location to wireless network 104. At that time, wireless device 101 may also receive a new route update radius from the access node used to transfer the location update.

Figure 2:
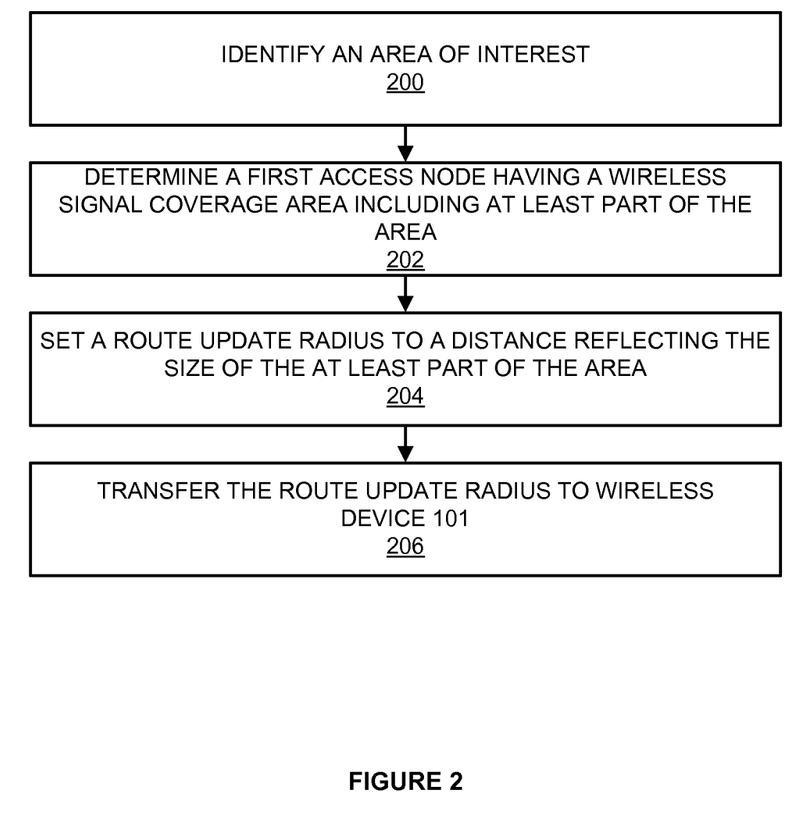
FIG. 2 illustrates an operation of the wireless communication system for determining device movement to and from an area of interest using a route update radius.

FIG. 2 illustrates an operation of wireless communication system 100 to determine device movement to and from an area of interest using a route update radius. Communication control system 103 identifies an area of interest within a geographic area (step 200). The area of interest may be identified by receiving a designation of the area of interest from a third party application, from a system within wireless network 104, from a user, or by any other manner that a system may receive an area designation—including combinations thereof. The area of interest may be identified based on geographic boundaries, manmade boundaries (i.e. city limits, streets, buildings, lots, etc.), geographic coordinates, wireless signal coverage areas, or any other manner of designating a geographic area—including combinations thereof.

Communication control system 103 then determines an access node of wireless network 104 having a wireless signal coverage area that includes at least part of the area of interest (step 202). In this example, communication control system 103 determines that the wireless signal coverage area of access node 102 includes at least part of the area of interest. Thus, the wireless signal coverage area of access node 102 may be equivalent to the area of interest, larger than the area of interest, or smaller than the area of interest. The area of interest may extend beyond the wireless signal coverage area of access node 102 and, in such cases, may include the entirety of the coverage area or may include only a portion of the coverage area.

After access node 102 is determined, control system 103 sets a route update radius for access node 102 to a distance that reflects the size of the at least part of the area of interest (step 204). In other words, the distance from access node 102 that the route update radius identifies is set to a distance that will cause wireless device 101 to send a location update to wireless network 104 when wireless device 101 reaches a boarder of the area of interest or at least the part of the area of interest covered by access node 102. For example, the route update radius is set to a distance equivalent to, or substantially equivalent to, the distance from access node 102 to the border of the area of interest or from access node 102 to a point where wireless device 101 will leave the wireless signal coverage area of access node 102. In some embodiments, the route update radius is measured from the location of access node 102 to the location of wireless device 101 and, in other embodiments, the location is measured from the location of access node 102 to the location of another access node having a wireless signal coverage area where wireless device 101 is located. The location for access node 102 and other access nodes (e.g. geographic coordinates) may be broadcast to wireless device 101 in a pilot signal from each respective access node.

Upon determining the route update radius, control system 103 directs access node 102 to transfer the route update radius to wireless device 101 (step 206). The route update radius may be transferred to wireless device 101 individually or wireless device 101 may receive the route update radius in a broadcasted signal, such as a pilot signal from access node 102, that allows other devices to receive the route update radius as well. Upon receiving the route update radius, wireless device 101 periodically determines its location in order to determine whether the route update radius has been exceeded. Wireless device 101 may determine its location based on a Global Positioning System (GPS) receiver located therein, based on a location of one or more base stations within wireless signal range of wireless device 101, or by any other means of determining a device location. If wireless device 101 has exceeded the route update radius, then wireless device 101 transfers the location of wireless device 101 to wireless network 104. Accordingly, wireless network 104 is notified when wireless device 101 leaves the area of interest.

In some embodiments, a similar method is used to set a route update radius for devices within the coverage areas of access nodes bordering outside the area of interest. In those embodiments, the route update radius, when exceeded, causes wireless device 101 to transfer a location update to wireless network 104 upon entering the area of interest. Thus, wireless network 104 is aware of wireless device 101 moving into and out of the area of interest. By storing the location information received when wireless device 101 moves into and out of the area of interest (i.e. the location itself, a time in which the location was received, etc.), wireless network 104 may be able to determine movement characteristics for wireless device 101. As other wireless devices receive the route update radius from access node 102, wireless network 104 may be able to determine movement characteristics for a group of wireless devices in relation to the area of interest.

In some embodiments, control system 103 returns the route update radius to a default value after a time designated for the area of interest. For example, the area of interest may only apply for a set amount of time or may be scheduled to end at a set time. Thus, device movement into and out of the area of interest is only tracked for the designated time after which the route update radius functionality of wireless network 104 returns to normal operation.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. Wireless access node 102 could be a base station, Internet access node, telephony service node, wireless data access point, or some other wireless communication system—including combinations thereof.

Communication control system 103 comprises a computer system and communication interface. Communication control system 103 may also include other components such as a router, server, data storage system, and power supply. Communication control system 103 may reside in a single device or may be distributed across multiple devices. Communication control system 103 is shown externally to wireless access node 102, but system 103 could be integrated within the components of wireless access node 102. Similarly, rather than being located between access node 102 and wireless network 104, system 103 may be located elsewhere on wireless network 104. Communication control system 103 could be a mobile switching center, network gateway system, Internet access node, application server, service node, or some other communication system—including combinations thereof.

Wireless communication network 104 comprises network elements that provide communications services to wireless device 101 through wireless access node 102. Wireless communication network 104 may comprise switches, additional wireless access nodes, Internet routers, network gateways, application servers, computer systems, communication links, or some other type of communication equipment—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 112-113 use metal, glass, air, space, or some other material as the transport media. Communication links 112-113 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 112-113 could be direct links or may include intermediate networks, systems, or devices.

Figure 3:
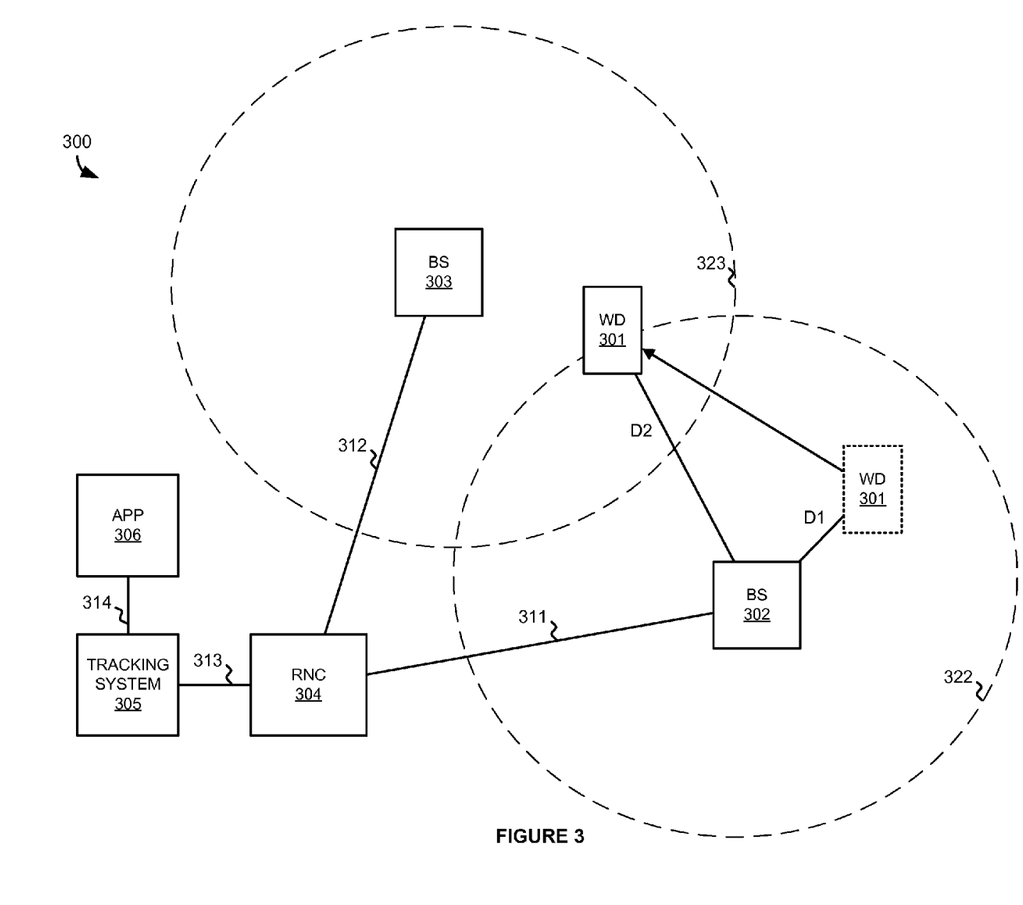
FIG. 3 illustrates a wireless communication system for determining device movement to and from an area of interest using a route update radius.

FIG. 3 illustrates wireless communication system 300. Wireless communication system 300 includes wireless communication device 301, wireless base station 302, wireless base station 303, radio network controller (RNC) 304, device tracking system 305, and application system 306. Wireless base stations 302-303 and RNC 304 communicate over communication links 311 and 312, respectively. RNC 304 and device tracking system 305 communicate over communication link 313. Device tracking system 305 and application system 306 communicate over communication link 314. Wireless device 301 exchanges wireless communications with base stations 302 and 303 via wireless links provided in wireless signal coverage areas 322 and 323, respectively. Coverage areas 322 and 323 are illustrated as being circular in shape and are overlapping, however, coverage areas 322 and 323 may take any other shape depending on wireless signal propagation characteristics at their respective locations.

In operation, application system 306 manages an application that requests device movement information from tracking system 305. For example, an event organizer may want to track the number of people moving into and out of an area where the event is held. The event organizer may then request that application system 306 retrieve device movement information related wireless devices moving into and out of the event area so that the organizer may be able to estimate a corresponding movement of people associated with those devices. Application system 306 requests this information from device tracking system 305. Since tracking system 305 is configured to obtain device location information in response to route update radii being exceeded, tracking system 305 may also perform functions related to determining which base stations should be used to page particular wireless devices. However, the paging functionality may be performed by another system. In those embodiments, tracking system 305 may intercept the location updates intended for the paging functionality or the updates may be forwarded from the system that performs the paging functionality.

Figure 4:
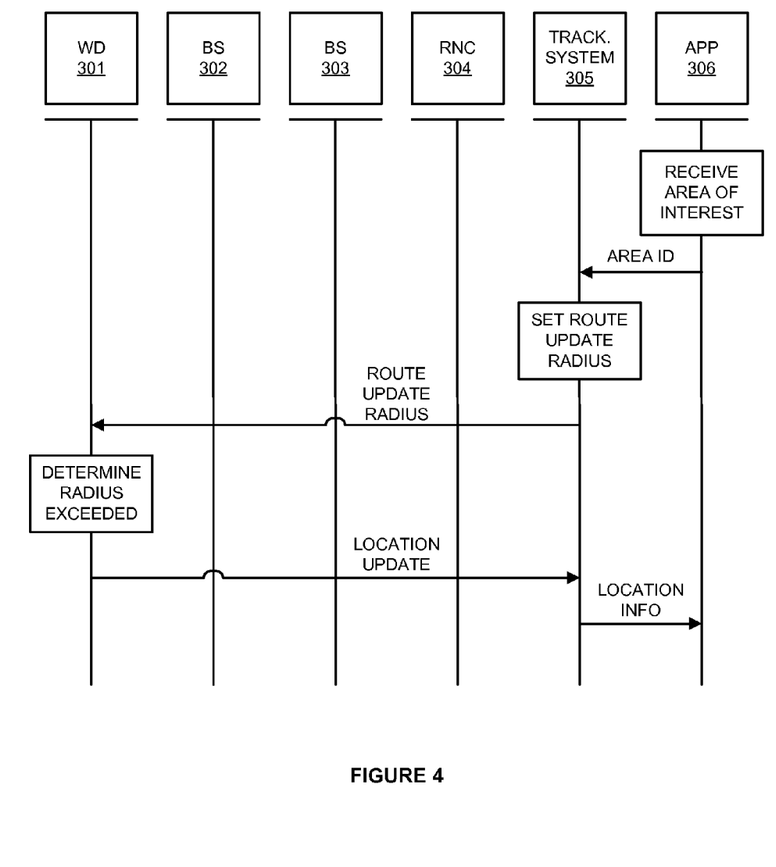
FIG. 4 illustrates an operation of the wireless communication system for determining device movement to and from an area of interest using a route update radius.

FIG. 4 is a sequence diagram illustrating an operation of wireless communication system 300 to determine device movement to and from an area of interest using a route update radius. Application system 306 receives an area of interest that should be monitored for wireless device movement. The area may be designated in any manner of designating a geographic area. Continuing the event example from above, the area of interest may be event grounds that are hosting the event. Application system 306 then transfers the identity of the area of interest to device tracking system 305. When transferring the identity, application system 306 may also transfer an indication of a time in which the area of interest should be monitored. For example, the time may correspond with a scheduled time for the event discussed above.

Upon receiving the identity of the area of interest, tracking system 305 determines and sets a route update radius for base stations having wireless signal coverage areas encompassing the area of interest. In some embodiments, the area of interest is defined as one or more wireless signal coverage areas and in other embodiments tracking system 305, or application system 306 before it, determines the wireless signal coverage areas that encompass the otherwise designated area of interest. In this particular embodiment, the area of interest is determined to include wireless device movement between coverage areas 322 and 323. Accordingly, tracking system 305 sets a route update radius for devices communicating with base station 302 to a distance that corresponds to a distance when a wireless device will hand off from base station 302 to base station 303. Tracking system 305 similarly sets the route update radius for base station 303 to a distance when a wireless device will hand off from base station 303 to base station 302. Upon determining the route update radii, tracking system 305 instructs each base station to transmit their respective route update radius to connected wireless devices.

In this embodiment, an exemplary wireless device 301 is initially communicating with base station 302. Therefore, wireless device 301 receives from base station 302 the route update radius set by tracking system 305 for base station 302. While dormant wireless device 301 then begins to periodically determine its location to determine whether the route update radius has been exceeded. At a first time, wireless device 301 determines that wireless device 301 is a distance D1 from base station 302. D1 is a distance that does not exceed the route update radius for base station 302 and, therefore, wireless device 301 does not transfer a location update to tracking system 305. At a second time after the first time, wireless device 301 determines that wireless device 301 is a distance D2 from base station 302. Since D2 is greater than the route update radius for base station 302, wireless device 301 transfers a location update to tracking system 305 via base station 303 since wireless device 301 has moved out of coverage area 322 and into coverage area 323. Upon receiving the location update, tracking system 305 stores the location and other related information, such as time of location receipt, in a database to record that wireless device 301 moved into coverage area 323.

Similarly, now that wireless device 301 has updated its location, wireless device 301 receives the route update radius for base station 303 from base station 303. Accordingly, since the route update radius for base station 303 is set to trigger a location update upon wireless device 301 entering coverage area 322, wireless device 301 will periodically determine its location to determine whether the new route update radius is exceeded. If the route update radius is exceeded, then wireless device 301 transfers a location update to tracking system 305. Tracking system 305 may then need to determine if the location is within coverage area 322 because wireless device 301 may have exceeded the route update radius by moving to a location other than one covered by coverage area 322. If it is determined that wireless device 301 moved into coverage area 322, the tracking system 305 stores the new location and related information in the database to record that wireless device 301 moved into coverage area 322.

The location information stored in the database by tracking system 305 for wireless device 301 and any other wireless devices that updated their location information using the method described above for wireless device 301 is then transferred to application system 306. The location information may be transferred in its entirety at the end of a time for which the area of interest was supposed to be monitored or portions of the location information may be transferred throughout the time either periodically or continually upon receipt from wireless devices. Once application system 306 has received the location information, application system 306 may process the location information to provide a user with metrics. For example, a metric may be calculated that indicates time periods when device movement into coverage area 322 was greatest and time periods when device movement out of coverage area 322 was greatest.

After an indicated time period for monitoring device movement in the area of interest has expired, tracking system 305 may return the route update radius to a normal or default distance. This allows the location updates for the paging functionality to return to normal operation in the area of interest. In some embodiments, tracking system 305 overrides the route update radius determined by a system controlling the paging functionality for the wireless network. In those embodiments, when the time expires, tracking system 305 ceases to override the route update radius determined by that paging system.

Figure 5:
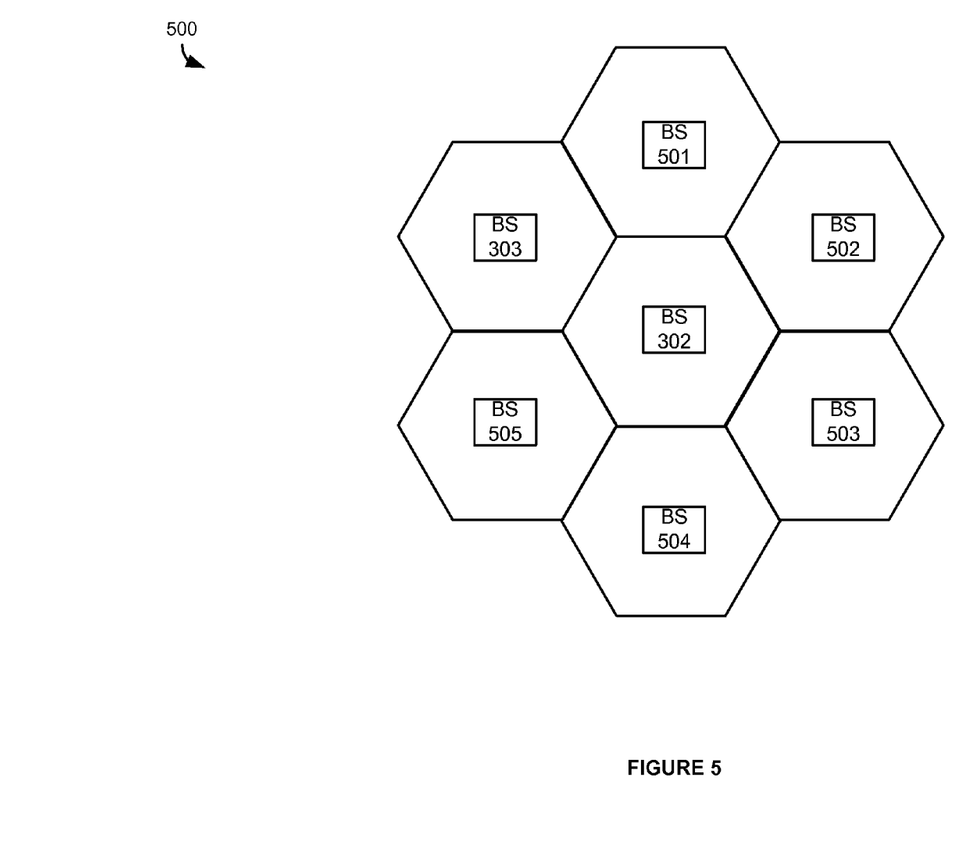
FIG. 5 illustrates a wireless communication system for determining device movement to and from an area of interest using a route update radius.

FIG. 5 illustrates wireless communication system 500. Wireless communication system 500 is an extension of wireless communication system 300 from FIG. 3. Wireless communication system 500 includes wireless base stations 302 and 303 along with additional wireless base stations 501-505. The wireless signal coverage areas for each base station is illustrated as octagonal for the purposes of clarity, however, the coverage areas may overlap and take different shapes and sizes depending on wireless signal propagation characteristics.

In operation, as with the example discussed above with respect to FIG. 4, application system 306 may indicate that an area of interest is the area wirelessly covered by base station 302. In this embodiment, application system 306 is interested in all wireless device movement into and out of the coverage area of base station 302. Therefore, in addition to setting the route update radii for base stations 302 and 303, as discussed above, tracking system 305 also sets the route update radii for each of base stations 501-505. In addition to wireless devices updating tracking system 305 with location information upon exceeding base station 302's route update radius, the wireless device communicating with base station 303 and base stations 501-505 will also update their locations whenever the route update radii for those surrounding base stations are exceeded. Upon receiving the location updates for wireless devices communicating with the surrounding base stations, tracking system 305 determines whether the location updates indicate that any of the devices moved into the coverage area of base station 302. If any of the devices did move into the coverage area of base station 302, then tracking system 305 will store the location information in the database.

Advantageously, modifying the route update radii for each of base stations 302, 303, and 501-505 allows tracking system 305 to track devices entering the coverage area of base station 302, devices leaving the coverage area of base station 302, and, more specifically, to which base station coverage area those devices move. The modification of the route update radii for this purpose takes advantage of functionality already included in the wireless devices to receive more specific location updates.

In some embodiments, the area of interest may correspond to the coverage areas of multiple base stations. For example, the area of interest may correspond to the coverage areas of all of base stations 302, 303, and 501-505. Therefore, tracking system may set the route update radii for the base stations surrounding the seven base stations shown in FIG. 5 to determine wireless device movement into and out of base stations 302, 303, and 501-505. Moreover, in that example, the route update radius for base station 302 may be larger than the coverage area of base station 302 and, instead, extend to the outer border of base stations 303 and 501-505 since that border is where the area of interest ends.

Figure 6:
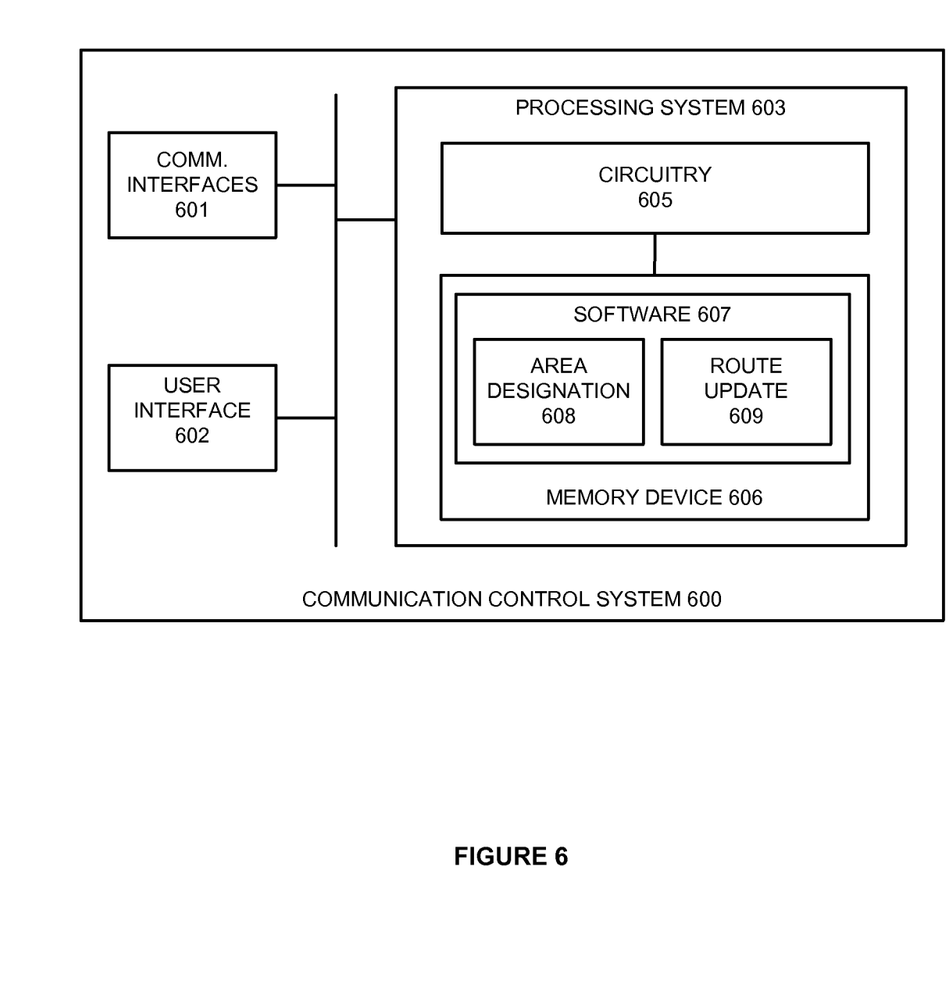
FIG. 6 illustrates a communication control system for determining device movement to and from an area of interest using a route update radius.

FIG. 6 illustrates communication control system 600. Communication control system 600 is an example of communication control system 103, although control system 103 may use alternative configurations. Communication control system 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Operating software 607 comprises computer programs, firmware, or some other form of machine-readable processing instructions. Operating software 607 includes area designation module 608 and route update radius module 609. Operating software 607 may further include an operating system, utilities, drivers, network interfaces, applications, or some other type of software. When executed by circuitry 605, operating software 607 directs processing system 603 to operate communication control system 600 as described herein.

In particular, area designation module 608 directs processing system 603 to identify an area of interest within a geographic area and determine a first access node of a wireless communication network having a first wireless signal coverage area that includes at least part of the area of interest. Route update radius module 609 directs processing system 603 to set a route update radius to a distance that reflects the size of the at least part of the area of interest and to transfer the route update radius to the wireless communication device via communication interface 601.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, comprising:
    identifying an area of interest within a geographic area;
    determining a first access node of a wireless communication network having a first wireless signal coverage area that includes at least part of the area of interest;
    determining a route update radius and transferring the route update radius to a wireless communication device wherein the route update radius comprises a threshold distance the wireless communication device can travel from the first access node;
    determining if the wireless communication device travels a distance exceeding the route update radius, and
    if the wireless communication device travels a distance exceeding the route update radius, then transferring a location update from the wireless communication device to the first access node.

2. The method of claim 1, further comprising:
    receiving a location update from the wireless communication device, wherein the wireless communication device transfers the location update in response to exceeding the route update radius.

3. The method of claim 2, further comprising:
    storing a location of the wireless communication device indicated by the location update.

4. The method of claim 2, wherein the location update is one of a plurality of location updates and further comprising:
    determining wireless communication device movement characteristics for the area of interest based on the plurality of location updates.

5. The method of claim 1, wherein the distance is set such that, when a wireless communication device hands off from the first access node, the route update radius is exceeded.

6. The method of claim 1, wherein the distance is less than a default route update radius distance.

7. The method of claim 1, wherein the distance is measured between a location of the first access node to a location of a second access node.

8. The method of claim 1, further comprising:
    upon satisfaction of a time criteria, resetting the route update radius to a default route update radius.

9. The method of claim 1, wherein the area of interest corresponds to the first wireless signal coverage area.

10. The method of claim 1, wherein the area of interest corresponds to a plurality of wireless signal coverage areas that include the first wireless signal coverage area.

11. A wireless communication system, comprising:
    a processing system configured to identify an area of interest within a geographic area, determine a first access node of a wireless communication network having a first wireless signal coverage area that includes at least part of the area of interest, determine a route update radius, and determine if a wireless communication device travels a distance exceeding the route update radius wherein the route update radius comprises a threshold distance the wireless communication device can travel before updating the location of the wireless communication device; and
    a communication interface configured to transfer the route update radius to the wireless communication device and if the wireless communication device travels a distance exceeding the route update radius, then transfer a location update from the wireless communication device to the first access node.

12. The wireless communication system of claim 11, further comprising:
    the communication interface configured to receive a location update from the wireless communication device, wherein the wireless communication device transfers the location update in response to exceeding the route update radius.

13. The wireless communication system of claim 12, further comprising:
    a storage medium configured to store a location of the wireless communication device indicated by the location update.

14. The wireless communication system of claim 12, wherein the location update is one of a plurality of location updates and further comprising:
    the processing system configured to determine wireless communication device movement characteristics for the area of interest based on the plurality of location updates.

15. The wireless communication system of claim 11, wherein the distance is set such that, when a wireless communication device hands off from the first access node, the route update radius is exceeded.

16. The wireless communication system of claim 11, wherein the distance is less than a default route update radius distance.

17. The wireless communication system of claim 11, wherein the distance is measured between a location of the first access node to a location of a second access node.

18. The wireless communication system of claim 11, further comprising:
    the processing system configured to, upon satisfaction of a time criteria, reset the route update radius to a default route update radius.

19. The wireless communication system of claim 11, wherein the area of interest corresponds to the first wireless signal coverage area.

20. The wireless communication system of claim 11, wherein the area of interest corresponds to a plurality of wireless signal coverage areas that include the first wireless signal coverage area.

* * * * *